(12) United States Patent
Dawson et al.

(10) Patent No.: US 9,390,467 B2
(45) Date of Patent: *Jul. 12, 2016

(54) MORPHING A DATA CENTER IN A VIRTUAL WORLD

(71) Applicant: International Business Machines Corporation, Armonk, NY (US)

(72) Inventors: Christopher J. Dawson, Arlington, VA (US); Michael J. Osias, Westtown, NY (US); Brian W. Sledge, Ruston, LA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/187,781

(22) Filed: Feb. 24, 2014

(65) Prior Publication Data
US 2014/0168269 A1    Jun. 19, 2014

Related U.S. Application Data

(63) Continuation of application No. 12/568,830, filed on Sep. 29, 2009, now Pat. No. 8,682,931.

(51) Int. Cl.
| G06F 7/00 | (2006.01) |
| G06F 17/30 | (2006.01) |
| G06T 3/00 | (2006.01) |
| H04L 12/701 | (2013.01) |
| H04L 12/751 | (2013.01) |
| H04L 12/707 | (2013.01) |
| H04L 12/703 | (2013.01) |
| H04L 12/26 | (2006.01) |
| G06T 11/60 | (2006.01) |

(52) U.S. Cl.
CPC ........ *G06T 3/0093* (2013.01); *G06F 17/30289* (2013.01); *G06F 17/30994* (2013.01); *G06T 11/60* (2013.01); *H04L 43/0817* (2013.01); *H04L 45/00* (2013.01); *H04L 45/02* (2013.01); *H04L 45/22* (2013.01); *H04L 45/28* (2013.01)

(58) Field of Classification Search
CPC .................... G06F 17/30289; G06F 17/30994
See application file for complete search history.

(56) References Cited

U.S. PATENT DOCUMENTS

| 5,958,012 A | 9/1999 | Battat et al. |
| 6,910,186 B2 | 6/2005 | Kim |

(Continued)

OTHER PUBLICATIONS

Oh et al., "Task-Role-Based Access Control Model". Information Systems 28, pp. 533-562, Elsevier Science Ltd., 2002.*

(Continued)

*Primary Examiner* — Michael Hicks
(74) *Attorney, Agent, or Firm* — Noah A. Sharkan; Hunter E. Webb; Keohane & D'Alessandro PLLC

(57) ABSTRACT

The present invention re-renders data center visualizations at different levels of abstraction based on roles or activities of an avatar. Morphing of data center objects is accomplished by either combining or decomposing existing data center objects in a manner that will result in a new object that maintains its relationship to the original objects. An example of this would be when creating an application object by combining an existing infrastructure objects (e.g., a server, a network and storage) used to support the application object runtime environment. This allows for the avatar to not only relate the application object to the supporting infrastructure objects, but also provides a view of how the application object is impacted whenever the supporting infrastructure objects change or break.

18 Claims, 5 Drawing Sheets

(56) References Cited

U.S. PATENT DOCUMENTS

| | | | |
|---|---|---|---|
| 7,319,992 | B2 | 1/2008 | Gaos |
| 8,397,168 | B2 | 3/2013 | Leacock et al. |
| 8,434,027 | B2 | 4/2013 | Jones |
| 8,671,198 | B2* | 3/2014 | Hamilton et al. ............. 709/226 |
| 8,676,975 | B2* | 3/2014 | Hamilton et al. ............. 709/226 |
| 2003/0004774 | A1* | 1/2003 | Greene et al. ...................... 705/8 |
| 2004/0030741 | A1 | 2/2004 | Wolton et al. |
| 2005/0131924 | A1* | 6/2005 | Jones ............................ 707/100 |
| 2005/0137015 | A1* | 6/2005 | Rogers ................... A63F 13/12 463/42 |
| 2006/0079325 | A1 | 4/2006 | Trajkovic et al. |
| 2007/0002057 | A1 | 1/2007 | Danzig et al. |
| 2007/0188502 | A1 | 8/2007 | Bishop |
| 2007/0233839 | A1 | 10/2007 | Gaos |
| 2008/0026838 | A1* | 1/2008 | Dunstan et al. ................. 463/30 |
| 2009/0251457 | A1* | 10/2009 | Walker ................... G06T 17/10 345/418 |
| 2009/0254843 | A1 | 10/2009 | Van Wie et al. |
| 2010/0083140 | A1* | 4/2010 | Dawson et al. ............... 715/757 |

OTHER PUBLICATIONS

Reiners et al., "Property-Based Object Management and Security", Security in Virtual Worlds, 3D Webs, and Immersive Environments: Models for Development, Interaction, and Mangement, Chapter 9, Jan. 2011, IGI GLobal.*

Wright et al., "Discretionary Access Controls for a Collaborative Virtual Environment", Technical Report, Retrieved from http://www.cse.nd.edu/Reports/2008/TR-2008-12.pdf on Jun. 18, 2015, 2008, University of Notre Dame.*

Sejong Oh et al., "Task-role-based access control model", Information Systems 28, pp. 533-562, Elsevier Science Ltd., 2002.

Manny Vellon et al., "The Architecture of a Distributed Virtual Worlds System", Proceedings of the 4th USENIX Conference on Object-Oriented Technologies and Systems (COOTS), Apr. 27-30, 1998, 11 pages.

Ahmed F. Waly et al., "A Virtual Construction Environment for preconstruction planning", Automation in Construction, vol. 12, Issue 2, 2002, pp. 139-154, Elsevier Science B.V.

Michael J. Hicks, USPTO Office Action, U.S. Appl. No. 12/568,830, Mail Date Jul. 16, 2012, 49 pages.

Michael J. Hicks, USPTO Final Office Action, U.S. Appl. No. 12/568,830, Mail Date Oct. 25, 2012, 13 pages.

Michael J. Hicks, USPTO Office Action, U.S. Appl. No. 12/568,830, Notification Date Apr. 13, 2013, 40 pages.

Michael J. Hicks, USPTO Final Office Action, U.S. Appl. No. 12/568,830, Notification Date Jul. 11, 2013, 16 pages.

Michael J. Hicks, USPTO Notice of Allowance and Fee(s) Due, U.S. Appl. No. 12/568,830, Date Mailed Nov. 5, 2013, 11 pages.

* cited by examiner

MORPHING A DATA CENTER IN A VIRTUAL WORLD

CROSS-REFERENCE TO RELATED APPLICATION

This application is a continuation of, and claims the benefit of, co-pending and co-owned U.S. patent application Ser. No. 12/568,830, filed Sep. 29, 2009, the entire contents of which are herein incorporated by reference.

FIELD OF THE INVENTION

The present invention relates generally to virtual universe technologies and, more specifically, to approaches for modifying a datacenter in a virtual world based upon roles, events and activities.

BACKGROUND OF THE INVENTION

Avatars in virtual worlds can have a wide range of business and social experiences, and such experiences are becoming more important as business and social transactions are becoming common in virtual worlds such as Second Life®. In fact, the characteristics of an avatar play important social, business, and other related rolls in virtual worlds, such as Second Life. Second Life is a privately owned three dimensional (3-D) virtual world, made publicly available by Linden Lab (Second Life is registered trademark of Linden Lab in the United States and/or other countries). The Second Life virtual world is computed and managed by a large array of servers that are owned and maintained by Linden Lab. The Second Life client program provides its users (referred to as residents) with tools to view, navigate, and modify the Second Life world and participate in its virtual economy.

An information technology (IT) data center is most often represented as a collection of server racks, operational consoles, storage subsystems and network hardware. This is due to the fact that when one walks through a real data center, all that can be observed is the infrastructure hardware and consoles. The problem with this is that for everyone except the IT infrastructure organization, the view is meaningless and cannot be easily connected to what is understandable by customers, executive management, business owners, finance staff, and in most cases even application development. However, in the 3-D world, it is possible to render views of a virtual data center that can be understood by anyone. This requires establishing systems and methods for assimilating and instantiating these alternate visualizations based on roles, business processes, and/or events/triggers.

SUMMARY OF THE INVENTION

One aspect of the invention provides a method for modifying a data center in a virtual world, the method comprising the computer-implemented steps of: providing a data center rendered in the virtual world, the data center comprising data center objects; modifying a structural feature of one or more of the data center objects to create a new data center object when an avatar encounters the data center, the new data center object having a relationship with the data center objects, and the new data center object created based on a corrective action to be performed by the avatar on the data center; and rendering, to the avatar, along with the new data center object, a software tool required for performing the corrective action on the data center.

Another aspect of the invention provides a computer-readable storage device storing computer instructions, which when executed, enables a computer system to morph existing data center objects in a virtual world, the computer instructions comprising: providing a data center rendered in the virtual world, the data center comprising data center objects; modifying a structural feature of one or more of the data center objects to create a new data center object when an avatar encounters the data center, the new data center object having a relationship with the data center objects, and the new data center object created based on a corrective action to be performed by the avatar on the data center; and rendering, to the avatar, along with the new data center object, a software tool required for performing the corrective action on the data center.

Yet another aspect of the invention provides a system in a virtual world, the system comprising: a memory medium comprising instructions; a bus coupled to the memory medium; and a processor coupled to a controller via the bus that when executing the instructions causes the system to: provide a data center rendered in the virtual world, the data center comprising data center objects; modify a structural feature of one or more of the data center objects to create a new data center object when an avatar encounters the data center, the new data center object having a relationship with the data center objects, and the new data center object created based on a corrective action to be performed by the avatar on the data center; and render, to the avatar, along with the new data center object, a software tool required for performing the corrective action on the data center.

BRIEF DESCRIPTION OF THE DRAWINGS

These and other features of this invention will be more readily understood from the following detailed description of the various aspects of the invention taken in conjunction with the accompanying drawings in which.

Figure 1:
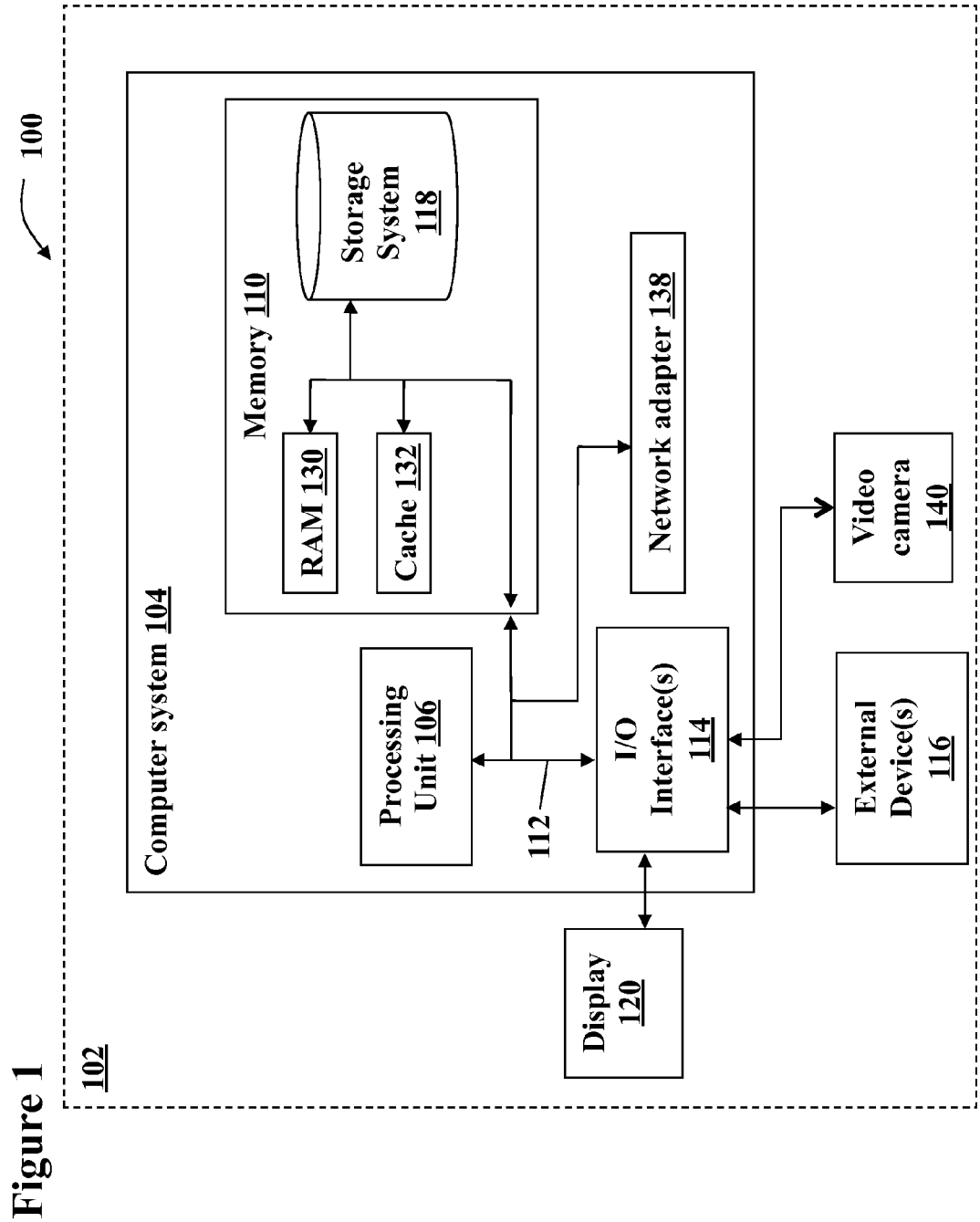
FIG. 1 shows a data processing system suitable for implementing an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE INVENTION

The present invention provides systems and methods for role-based morphing of virtual data center objects. It renders data center visualizations at different levels of abstraction based on roles or activities of an avatar. Morphing of data center objects is accomplished by either combining or decomposing existing data center objects in a manner that will result in a new object that maintains its relationship to the original objects. An example of this would be when creating an application object by combining the existing infrastructure (server, network and storage) objects used to support the application runtime environment. This allows for the avatar to not only relate the application object to the supporting infrastructure objects, but also provides a view of how the application is impacted whenever the supporting infrastructure objects change or "break."

Virtual worlds and universes (terms may be used interchangeably) represent the latest technological forefront and present a tremendous new platform for improving how people interpret what can be seen within a virtual data center, thereby improving an organization's understanding of the IT environment's impact on the business. These new capabilities will also enable innovative techniques for leveraging activities (either business or IT) and/or triggers to provide visualizations that represent different contexts not previously available.

In addition to morphing, other aspects of this invention may be how the roles or activities of the avatar influence the rendering of the data center objects in the virtual world such as the role of the avatar can be instantiated by any number of mechanisms, such as applying a profile during the login process, by the inventory carried by the avatar or possibly by the appearance of an avatar. The roles can be predefined based on alignment to things like organization, function or group membership. The roles could also be created in real time or ad-hoc based on things like the inventory being carried by an avatar, as an example. Once the role is identified, the objects within the data center that the avatar interacts with or views could then be morphed into objects meaningful to that role.

Another aspect may be that the activity of an avatar can be determined by any number of methods, such as selecting an activity within a drop down list or executing a command or interacting directly with an object's exposed attributes/methods.

Yet another aspect may be providing the ability to morph data center objects based on role, that is, how an avatar's role can influence the way objects in a data center are visualized.

Another aspect of the present invention may be providing the ability to morph data center objects based on activity, that is, how can an avatar create different visualizations based on activities and interactions within the data center.

A first embodiment utilizes role-based visualizations.

A second embodiment utilizes how an avatar can control the visualization of the data center objects based on the activities being performed. What is actually displayed could include, but is not limited to the objects displayed, color of the objects, size and location of these objects. The color could indicate what objects can be interacted with or the criticality of the system (health, current status, etc.). The size and location of the objects could be manipulated to provide the avatar with easier access and enhanced appearance to make it more obvious of what objects to focus on managing.

The present invention comprises a system to allow a data center in a virtual world to be morphed based upon roles, events and activities of the avatars in the virtual world.

The present invention may be implemented in a first implementation by morphing the data center objects based on role of the avatar. The morphing method may comprise these steps:
1. when an avatar having a profile enters virtual data center, cross referencing the profile of the avatar against a role directory within the data center; and
2. once the appropriate role of the avatar is linked to the avatar, applying the appropriate morphing rules to the data center environment.

Based on the morphing rules, maybe existing data center objects are rendered to represent the appropriate set of data center objects seen by the avatar.

An example may of a service owner for the electronic health record to login and navigate his avatar to the data center environment and only see a visual instantiation of the electronic health record services. Rather than normally seeing racks of servers and storage and the service owner may visualize the IT environment in a context that is relative to his/her job and knowledge.

This same example can be contrasted with a UNIX administrator, whose visualization of the data center may be the rack of UNIX servers he/she is responsible for managing. UNIX® is a registered trademark of The Open Group, an industry standards consortium. These visual instantiations are created through the morphing rules associated with their respective avatar's profile and role. The morphing rules are associated with the various levels of abstraction that are present within an IT environment. In addition, each role may be associated with one of these abstraction levels, which may be determined so that morphing rules may be applied to the virtual data center environment.

Another example may be to morph the data center objects based on the activity of the avatar. For example, an avatar may enter the virtual data center. Then the avatar may approach an activity console within the virtual data center. The activity console can present the avatar with a drop down list of activities to select. The avatar may select the activity labeled "Patch Server". Upon selecting the "Patch Server" activity, the appropriate morphing rules may be applied to the data center environment. Based on the morphing rules, the existing data center objects may be rendered to represent the appropriate data center objects needed by the avatar to complete the activity.

An example of this could be that a UNIX administrator selects the "patch server" activity and then the system within the VU renders the existing objects within the data center to create the UNIX servers available to be patched and possibly even renders the actual patching tool to use for the patching the server. In this example, the morphing rules could not only render the right level of abstraction but based on the additional context of an activity, be able to render a combination of abstraction levels (e.g., the UNIX server to be patched and the application for performing the patching activities).

Another approach is to morph the data center objects based on activity as follows:
1. an avatar enters the virtual data center;
2. the avatar approaches the activity console within the virtual data center;
3. the activity console presents the avatar with a drop down list of activities to select;
4. the avatar selects the activity labeled "Patch Server";
5. upon selecting the "Patch Server" activity, appropriate morphing rules are applied to the data center environment; and
6. based on the morphing rules, the existing data center objects are rendered to represent the appropriate data center objects needed by the avatar to complete this activity.

FIG. 1 shows a system 100 that may have a data processing system 102 suitable for implementing an embodiment of the present invention. Data processing system 102 may have a computer system 104 connected to a display 120, external device(s) 116 and video camera 140 or other peripheral devices for providing a user an interface to computer system 140 being connected via I/O interface(s) 114. Computer system 104 may have an internal bus 112 for providing internal communication such modules as processing unit 106, I/O interface(s) 114, network adapter 138 and memory 110. Memory 110 may have random access memory (RAM) 130, cache 132 and storage system 118 or other forms of memory. RAM may take the form of integrated circuits that allow stored data to be accessed in any order (i.e., at random).

Storage system 118 may take the form of tapes, magnetic discs and optical discs and are generally used for long term storage of data. Cache 132 is a collection of data duplicating original values stored elsewhere or computed earlier, where the original data is expensive to fetch (owing to longer access time) or to compute, compared to the cost of reading the cache. In other words, a cache is a temporary storage area where frequently accessed data can be stored for rapid access. Once the data is stored in the cache, it can be used in the future by accessing the cached copy rather than re-fetching or recomputing the original data. A cache has proven to be extremely effective in many areas of computing because access patterns in typical computer applications have locality of reference.

Figure 2:
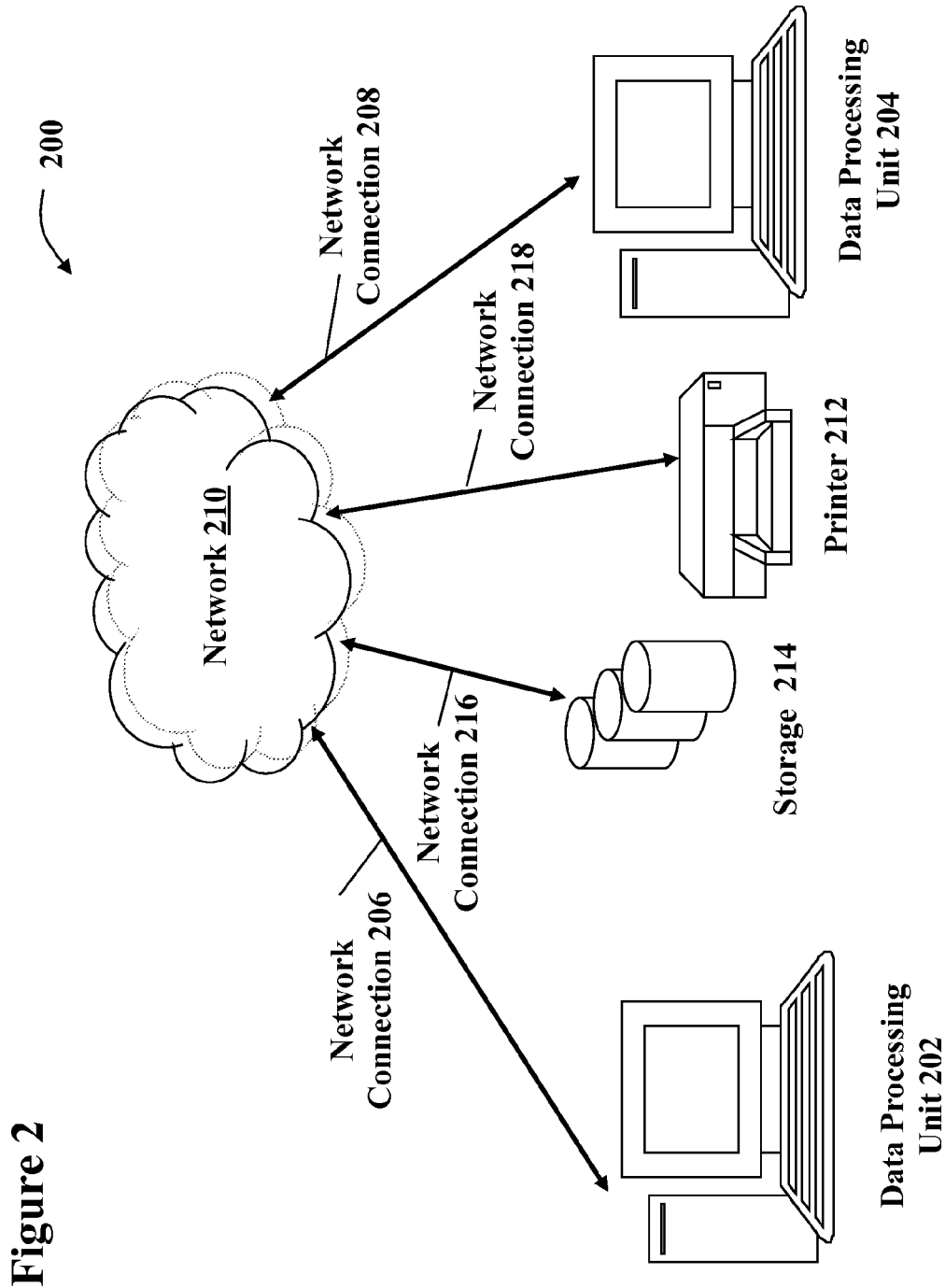
FIG. 2 shows a network for implementing an embodiment of the present invention.

FIG. 2 shows a network system 200 for implementing an embodiment of the present invention. Network system 200 may have a network 210 or group of interconnected computers, such as data processing units 202, 204, via network connections 206, 208 and may be of the type, e.g., a local area network (LAN) or internetwork. Printer 212 and storage 214 may be connected to network 210 via network connections 216, 218. Basic network components may include network interface cards, repeaters, hubs, bridges, switches and routers. Data processing units 202, 204 may be computers such as web servers or personal computers, or other user agents. A web server generally has hardware and software that are responsible for accepting HTTP requests from clients (user agents such as web browsers), and serving them HTTP responses along with optional data contents, which usually are web pages such as HTML documents and linked objects (images, etc.).

Figure 3:
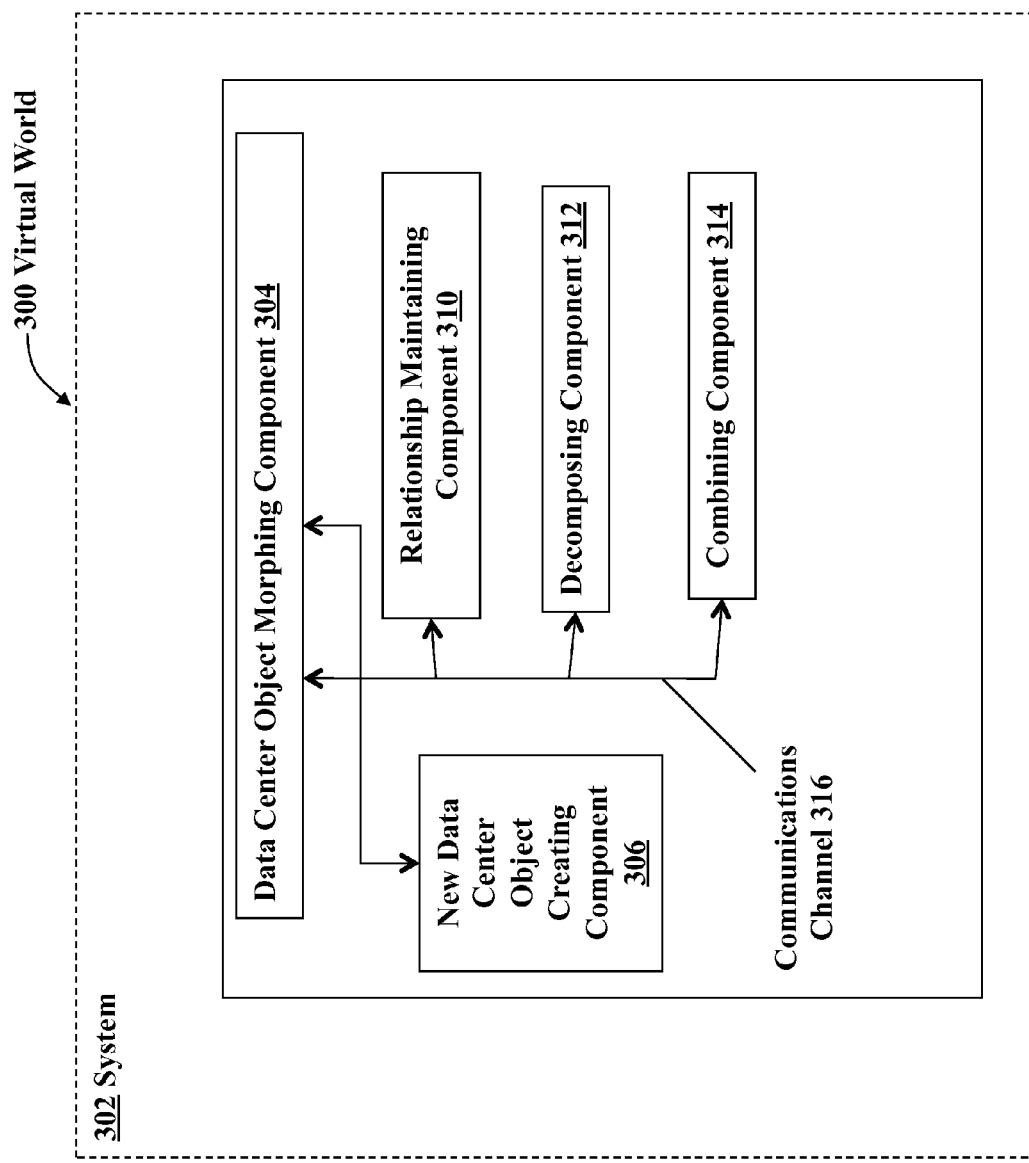
FIG. 3 illustrates a system of the present invention.

As shown in FIG. 3, a virtual world 300 is shown. It has a VU System 302. The VU System 302 has a data center object morphing component 304, a new data center object creating component 306, a relationship maintaining component 310, a decomposing component 312 and a combining component 314 all interconnected by a communications channel 316. It is understood that the virtual world, VU system 302, and/or one or more of the various components of FIG. 3 are typically implemented be implemented within computer memory such as memory 110 of FIG. 1.

Figure 4:
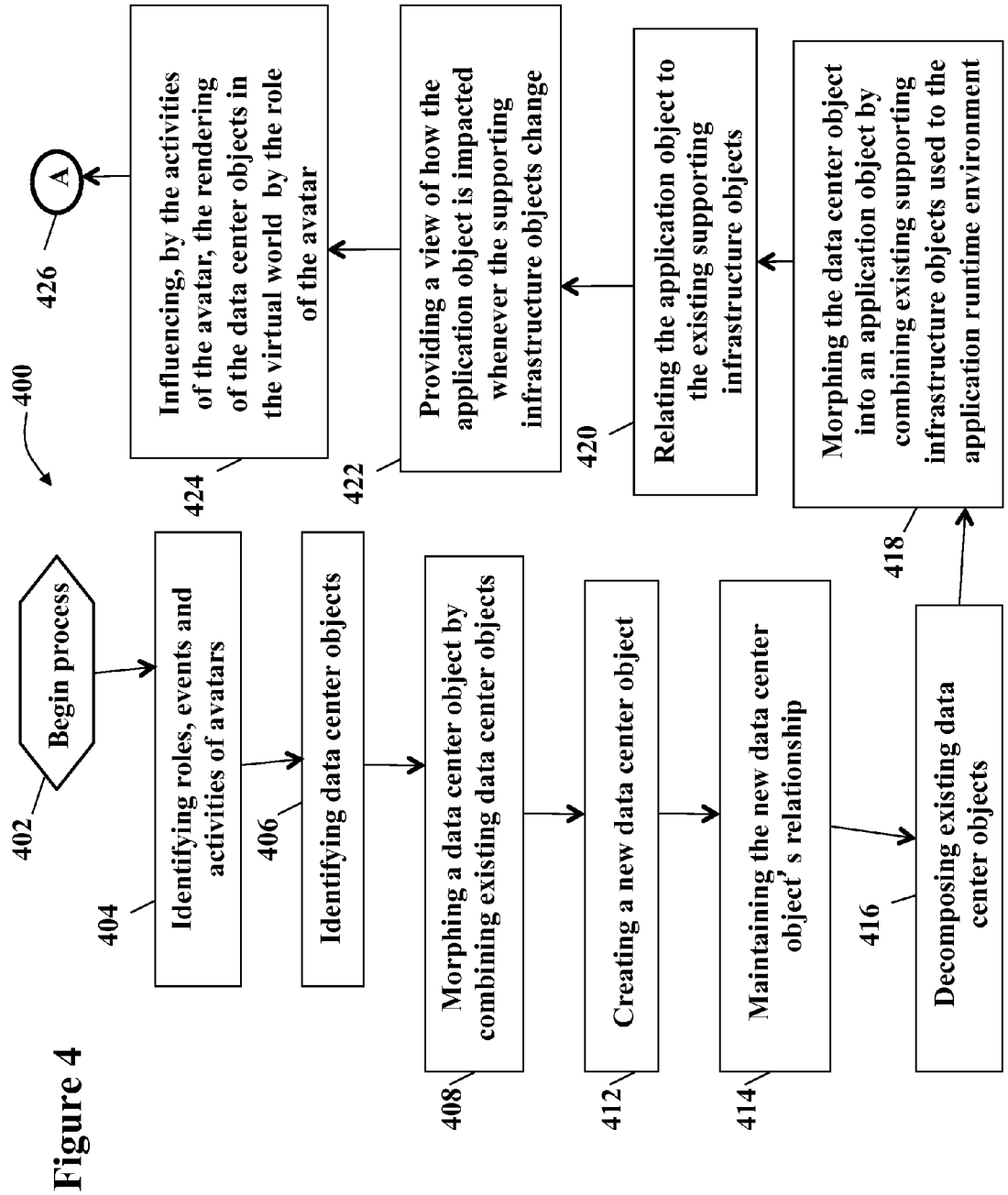
FIG. 4 illustrates a method of the present invention.

As shown in FIG. 4, a method 400 of the present invention is shown. At 402, the method begins and at 404 the roles, events and activities of the avatars are identified. At 406, the data center objects are identified. At 408, a data center object is morphed by combining data center objects. At 412, a new data center object is created. At 414, the new data center object's relationship is maintained. At 416, the existing data objects are decomposed and, at 418, the data center object is morphed into an application object by combining existing supporting infrastructure objects used to the application runtime environment. At 420, the application object is related to the existing supporting infrastructure objects. At 422, a view is provided of how the application object is impacted whenever the supporting infrastructure objects change. At 424, the activities of the avatar may influence the rendering of the data center objects in the virtual world by the role of the avatar and continues to "A" at 426 which continue at FIG. 5.

Figure 5:
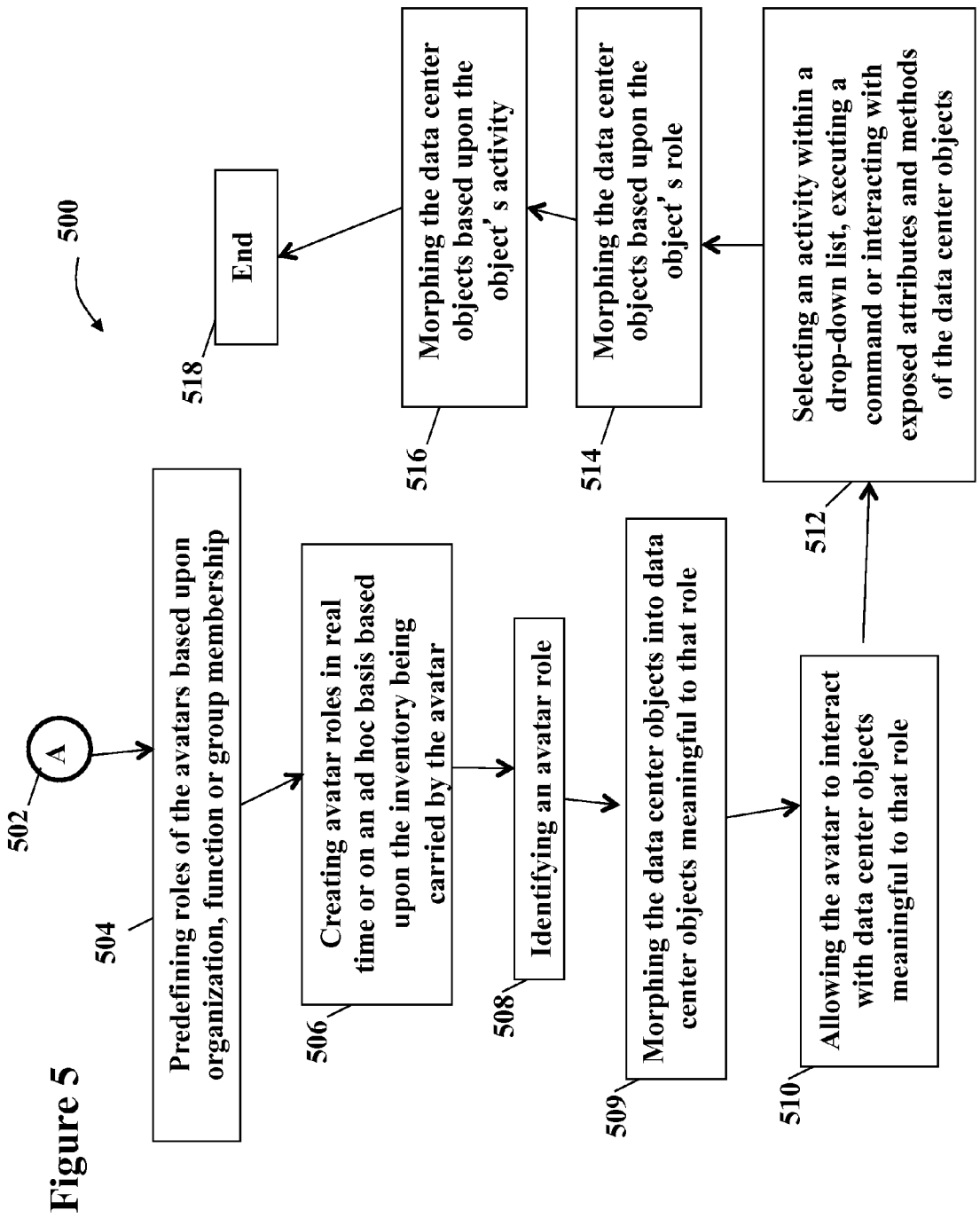
FIG. 5 illustrates a method of the present invention.

As shown in FIG. 5, the method 500 continues at "A" 502 to 504 roles of the avatars are predefined based upon organization, function or group membership. At 506, avatar roles are created in real time or on an ad hoc basis based upon the inventory being carried by the avatar. At 508, an avatar role is identified. At 509, the data center objects are morphed into data center objects meaningful to that role. At 510, the avatar is allowed to interact with data center objects meaningful to that role. At 512, an activity may be selected from within a drop-down list, a command may be executed or exposed attributes and methods of the data center objects may be interacted with. At 514, the data center objects may be morphed based upon the object's role. At 516, the data center objects may be morphed based upon the object's activity. At 518, the method ends.

It should be understood that the present invention is typically computer-implemented via hardware and/or software. As such, client systems and/or servers will include computerized components as known in the art. Such components typically include (among others), a processing unit, a memory, a bus, input/output (I/O) interfaces, external devices, etc.

While shown and described herein as a system to allow a datacenter in a virtual world to be morphed based upon roles, events and activities, it is understood that the invention further provides various alternative embodiments. For example, in one embodiment, the invention provides a computer-readable/useable medium that includes computer program code to enable a computer infrastructure for a system to allow a datacenter in a virtual world to be morphed based upon roles, events and activities. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a computer-implemented method for a system to allow a datacenter in a virtual world to be morphed based upon roles, events and activities. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for modifying a data center in a virtual world, the method comprising the computer-implemented steps of:
   providing a data center rendered in an area of the virtual world, the data center comprising a display in the area of images of data center objects that represent components of a real-world data center;
   creating, in response to an entry of a first avatar into the area, a first role associated with the first avatar based directly upon inventory being carried by the first avatar;
   morphing, in response to an entry of the first avatar into the area, a rendering of the display of an image corresponding to a data center object within the display and entirety of the images in the area to accentuate a display characteristic of the data center object with respect to other data center objects, the data center object to be morphed being selected based on the first role of a first user associated with the first avatar;
   creating, in response to an entry of a second avatar into the area, a second role associated with the second avatar directly based upon inventory being carried by the second avatar; and
   morphing, in response to an entry of a second avatar into the area, a rendering of the display of an image corresponding to a different data center object within the display and entirety of the images in the area to accentuate a display characteristic of the different data center object with respect to other data center objects, the different data center object to be morphed being selected based on a second role of a second user associated with the second avatar.

2. The method as defined in claim 1 further comprising the computer-implemented steps of:
   decomposing existing data center objects;
   creating, by one of the first avatar or the second avatar, a new datacenter object; and
   maintaining the new data center object's relationship to the existing data center objects.

3. The method as defined in claim 2 wherein the data center system has an existing supporting infrastructure objects used to support an application runtime environment, the method further comprising the computer-implemented step of morphing an existing data center object into an application object by combining existing supporting infrastructure objects used to support the application runtime environment.

4. The method as defined in claim 3 further comprising the computer-implemented step of relating the application object to the existing supporting infrastructure objects.

5. The method as defined in claim 4 further comprising the computer-implemented step of providing a view of how the application object is impacted whenever the existing supporting infrastructure objects change.

6. The method as defined claim 5 further comprising the computer-implemented step of influencing, by an activity of the first avatar and an event of the first avatar, the rendering of the data center objects in the virtual world by the role of the first avatar.

7. The method as defined in claim 6 further comprising the computer-implemented step of predefining the roles to at least one of: organization, function, and group membership.

8. The method as defined in claim 7 further comprising the computer-implemented steps of:
   morphing the data center objects into data center objects meaningful to at least one of the set of roles; and
   allowing the avatar to interact with the objects meaningful to at least one of the set of roles.

9. The method as defined in claim 1 further comprising the computer-implemented steps of:
   selecting a corrective action from a set of corrective actions generated based upon the role of the avatar, the set of corrective actions visually displayed to the avatar as a drop down list when the avatar encounters the data center;
   modifying a structural feature of one or more of the data center objects to create a new data center object when an avatar encounters the data center, the new data center object having a relationship with the data center objects, and the new data center object created based on a corrective action to be performed by the avatar on the data center; and
   rendering, to the avatar, along with the new data center object, a software tool required for performing the corrective action on the data center.

10. The method as defined in claim 1 further comprising the computer-implemented step of identifying a set of roles of an avatar from a profile of the avatar and an inventory of the avatar, each of the set of roles defining an association of the avatar with the data center.

11. The method as defined in claim 9 wherein the avatar has an activity, the method further comprising the computer-implemented step of morphing data center objects based upon the activity of an avatar.

12. A computer-readable storage device storing computer instructions, which when executed, enables a computer system to morph existing data center objects in a virtual world, the computer instructions comprising:
   providing a data center rendered in an area of the virtual world, the data center comprising a display in the area of images of data center objects that represent components of a real-world data center;
   creating, in response to an entry of a first avatar into the area, a first role associated with the first avatar based directly upon inventory being carried by the first avatar;
   morphing, in response to an entry of the first avatar into the area, a rendering of the display of an image corresponding to a data center object within the display and entirety of the images in the area to accentuate a display characteristic of the data center object with respect to other data center objects, the data center object to be morphed being selected based on the first role of a first user associated with the first avatar
   creating, in response to an entry of a second avatar into the area, a second role associated with the second avatar based directly upon inventory being carried by the second avatar; and
   morphing, in response to an entry of a second avatar into the area, a rendering of the display of an image corresponding to a different data center object within the display and entirety of the images in the area to accentuate a display characteristic of the different data center object with respect to other data center objects, the different data center object to be morphed being selected based on a second role of a second user associated with the second avatar.

13. The computer-readable storage device as defined in claim 12 wherein the computer instructions further comprise:
   decomposing existing data center objects;
   creating, by one of the first avatar or the second avatar, a new datacenter object; and maintaining the relationship of the new data center object to the existing data center objects.

14. The computer-readable storage device as defined in claim 13 wherein the computer instructions further comprise morphing the data center object into an application object by combining an existing supporting infrastructure object used to support an application runtime environment.

15. The computer-readable storage device as defined in claim 13, wherein the computer instructions further comprise identifying a set of roles of an avatar from a profile of the avatar, each of the set of roles defining an association of the avatar with the data center.

16. A system in a virtual world, the system comprising:
a memory medium comprising instructions;
a bus coupled to the memory medium; and
a processor coupled to a controller via the bus that when executing the instructions causes the system to:
provide a data center rendered an area of in the virtual world, the data center comprising a display in the area of images of data center objects that represent components of a real-world data center;
create, in response to an entry of a first avatar into the area, a first role associated with the first avatar based directly upon inventory being carried by the first avatar;
morph, in response to an entry of the first avatar into the area, a rendering of the display of an image corresponding to a data center object within the display and entirety of the images in the area to accentuate a display characteristic of the data center object with respect to other data center objects, the data center object to be morphed being selected based on the first role of a first user associated with the first avatar;
create, in response to an entry of a second avatar into the area, a second role associated with the second avatar based directly upon inventory being carried by the second avatar; and
morph, in response to an entry of a second avatar into the area, a rendering of the display of an image corresponding to a different data center object within the display and entirety of the images in the area to accentuate a display characteristic of the different data center object with respect to other data center objects, the different data center object to be morphed being selected based on a second role of a second user associated with the second avatar.

17. The system as defined in claim 16 the instructions further causing the system to:
decompose existing data center objects to create the new data center object;
creating, by one of the first avatar or the second avatar, a new datacenter object; and
maintain the relationship of the new data center object to the existing data center objects.

18. The system as defined in claim 16 the instructions further causing the system to morph the data center object into an application object by combining an existing supporting infrastructure object used to support an application runtime environment.

* * * * *